United States Patent [19]

Schäuble

[11] Patent Number: 4,468,963

[45] Date of Patent: Sep. 4, 1984

[54] METHOD AND APPARATUS FOR MEASURING THE MASS OF A PULSATING MEDIUM FLOWING IN A FLOW CROSS SECTION

[75] Inventor: Werner Schäuble, Freiburg, Fed. Rep. of Germany

[73] Assignee: Robert Bosch GmbH, Stuttgart, Fed. Rep. of Germany

[21] Appl. No.: 409,246

[22] Filed: Aug. 18, 1982

[30] Foreign Application Priority Data

Sep. 10, 1981 [DE] Fed. Rep. of Germany ....... 3135793

[51] Int. Cl.³ .............................................. G01F 1/68
[52] U.S. Cl. ......................................... 73/204; 73/118
[58] Field of Search ........................ 73/118, 204, 202; 123/494

[56] References Cited

U.S. PATENT DOCUMENTS 4,403,506 9/1983 Lauterbach ........................ 73/118 X
4,404,846 9/1983 Yamauchi et al. .............. 123/494 X Primary Examiner—Jerry W. Myracle
Attorney, Agent, or Firm—Edwin E. Greigg

[57] ABSTRACT

A method and apparatus are proposed for measuring the mass of a pulsating medium flowing in a flow cross section, in particular for measuring the aspirated air mass of internal combustion engines. The apparatus includes a temperature-dependent measuring resistor, the temperature and/or resistance of which is regulated in accordance with the mass of flowing medium. The measurement signal representing the medium mass is influenceable in accordance with the flow direction by at least one first temperature-dependent indication resistor, whose resistance value can be ascertained by a resistance measuring circuit and can be compared with the resistance value, also ascertained by a resistance measuring circuit, of a second temperature-dependent indication resistor. The first indication resistor and the second indication resistor are disposed on a carrier spaced apart from one another, and the difference between the two resistance values characterizes the flow direction, so that if there is a flow occurring counter to the desired flow direction, the measurement signal can be suppressed and incorrect measurement is prevented.

17 Claims, 4 Drawing Figures

METHOD AND APPARATUS FOR MEASURING THE MASS OF A PULSATING MEDIUM FLOWING IN A FLOW CROSS SECTION

BACKGROUND OF THE INVENTION

The present invention relates to a method for measuring the mass of a pulsating medium flowing in a flow cross section, in particular, for measuring the aspirated air mass of internal combustion engines. A method and an apparatus are already known in which the measuring signal corresponding to the mass of air aspirated by an internal combustion engine includes an error, which is based on the fact that the apparatus also ascertains the mass of the air flowing backward in the intake tube of the engine because of the pulsation.

OBJECT AND SUMMARY OF THE INVENTION

The method according to the invention for measuring the mass of a pulsating medium flowing in a flow cross section has the advantage over the prior art in that the mass of medium flowing in the desired flow direction is correctly ascertained, and errors in the measurement signal caused by a reversal in the flow direction are prevented.

The apparatus according to the invention for performing the method for measuring the mass of a pulsating medium flowing in a flow cross section has the advantage in that a measurement signal which does not include any errors caused by a flow reversal can be ascertained with simple means.

The invention will be better understood and further objects and advantages thereof will become more apparent from the ensuing detailed description of one preferred embodiment taken in conjunction with the drawings.

DESCRIPTION OF THE PREFERRED EMBODIMENTS

Figure 1:
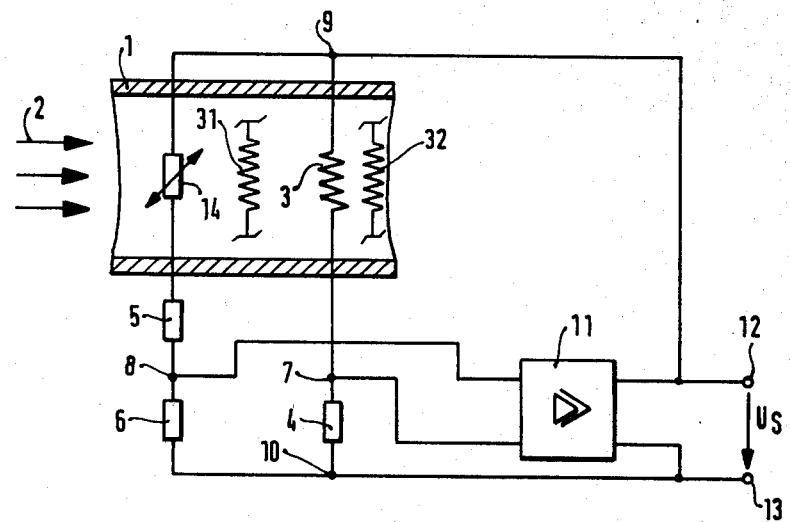
FIG. 1 is a circuit diagram of an apparatus for measuring the mass of a flowing medium.

In FIG. 1, a flow section 1 is shown, by way of example an air intake tube of an internal combustion engine (not shown), through which a medium, for instance the air aspirated by the engine, flows in the direction of the arrows 2. A temperature-dependent measuring resistor 3, for instance a hot-layer or hot-film resistor or a hot wire which experiences the flow through it of the output variable of a regulator and simultaneously provides the input variable for the regulator is disposed in the flow cross-section 1. The temperature of the temperature-dependent measuring resistor 3 is set by the regulator to a fixed value, which is above the average air temperature. Now if the flow velocity, that is, the mass of medium aspirated per unit of time, increases, then the temperature-dependent measuring resistor 3 cools down to an increased extent. This cooling is fed back to the input of the regulator, so that the regulator elevates its output variable such that the fixed temperature value at the temperature-dependent measuring resistor 3 is re-established. The output variable of the regulator regulates the temperature of the temperature-dependent measuring resistor 3 in the event of changes in the aspirated mass of medium to the predetermined value and simultaneously represents a standard for the aspirated mass of medium, which can be delivered as a measurement signal to a metering circuit, for example, of an internal combustion engine in order to adapt the required mass of fuel to the mass of air aspirated per unit of time.

The temperature-dependent measuring resistor 3 is disposed in a resistance-measuring circuit, for instance a bridge circuit, and with a resistor 4 together forms a first bridge branch, with a second bridge branch comprising the two fixed resistors 5 and 6 being switched in parallel to it. The pick-up point 7 is located between resistors 5 and 6. The two bridge branches are switched in parallel in points 9 and 10. The diagonal voltage of the bridge appearing between points 7 and 8 is fed to the input of an amplifier 11, to the output terminals of which points 9 and 10 are connected, so that the output variable of this amplifier 11 supplies the bridge with operating voltage or operating current. The output variable, which is designed as the control variable $U_S$, can be picked up between the terminals 12 and 13, as indicated in FIG. 1.

The temperature-dependent measuring resistor 3 is heated up by the current flowing through it to a value at which the input voltage of the amplifier 11, that is, the bridge diagonal voltage, becomes zero or assumes a predetermined value. A specific current then flows from the output of the amplifier into the bridge circuit. If as a result of changes in the mass of the flowing medium the temperature of the temperature-dependent measuring resistor 3 also varies, then the voltage at the bridge diagonal varies as well, and the amplifier 11 regulates the bridge supply voltage or the bridge current to a value at which the bridge is again balanced or is imbalanced in a predetermined manner. The output variable of the amplifier 11, that is, the control voltage $U_S$, like the current in the temperature-dependent measuring resistor 3, represents a measurement signal for the mass of flowing medium, for instance the mass of air aspirated by an engine.

In order to compensate for the influence of temperature of the medium on the measurement result, it may be efficacious to include a second resistor 14 in the second bridge branch, this second resistor also being surrounded by the flow of the medium. The dimensions of the resistors 5, 6 and 14 should be selected such that the power loss of the temperature-dependent resistor 14, which is caused by the branch current flowing through it, is low enough that the temperature of this resistor 14 virtually does not vary when there are changes in the bridge voltage, but rather always corresponds to the temperature of the medium flowing past it.

Figure 2:
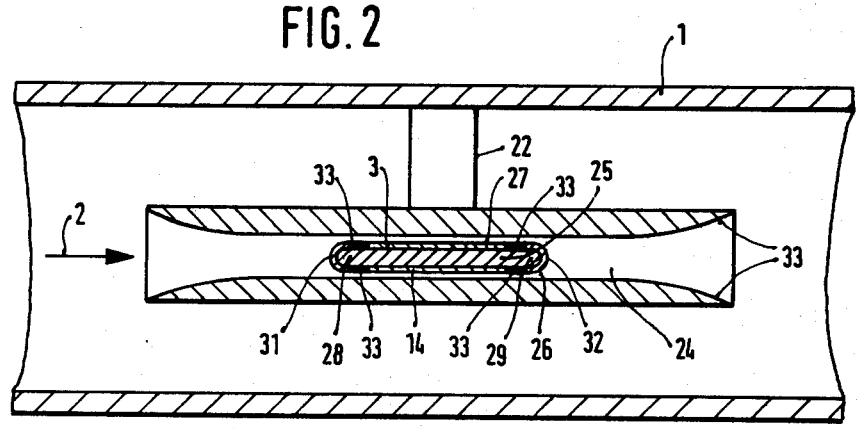
FIG. 2 shows an apparatus for measuring the mass of a flowing medium.

One embodiment of an apparatus for measuring the mass of a flowing medium is shown in FIG. 2, where in order to obtain the most stable possible flow in the form of a laminar gap flow without separations, a gap body 23 having the least possible flow resistance is disposed in the flow cross section 1 via a strut 22. The gap body 23 has a narrow gap parallel to the flow in which a laminar gap flow without separations prevails. A carrier 25 embodied in plate-like fashion is disposed in the gap 24 in such a way that partial gaps 26 and 27 are produced at either side of the carrier 25, in each of which a laminar gap flow prevails. The end 28 of the carrier 25 facing into the flow direction 2 and the end 29 of the carrier 25 remote from the flow are preferably rounded. The temperature-dependent measuring resistor 3, in the form of a layer or film resistor, for example, is attached to the carrier 25 parallel to the gap 24, and the measuring resistor 3 may be provided at either side of the carrier 25 or on only one side, for instance, being oriented towards the gap 27, while on the other side of the carrier 25 the resistor 14 can be attached oriented toward the gap 26. A temperature-dependent first indication resistor 31 is disposed upstream of the measuring resistor on the end 28 of the carrier facing into the flow and is electrically insulated from the measuring resistor 3, while a temperature-dependent second indication resistor 32 is disposed downstream of the measuring resistor 3 and electrically insulated from it on the end 29 of the carrier 25 remote from the flow. The indication resistors 31, 32 are preferably embodied as resistor layers or resistor films and are disposed spaced apart from one another in the flow direction. Insulating elements 33 are provided between the indication resistors 31, 32 and the measuring resistor 3 or the resistor 14.

Figure 3:
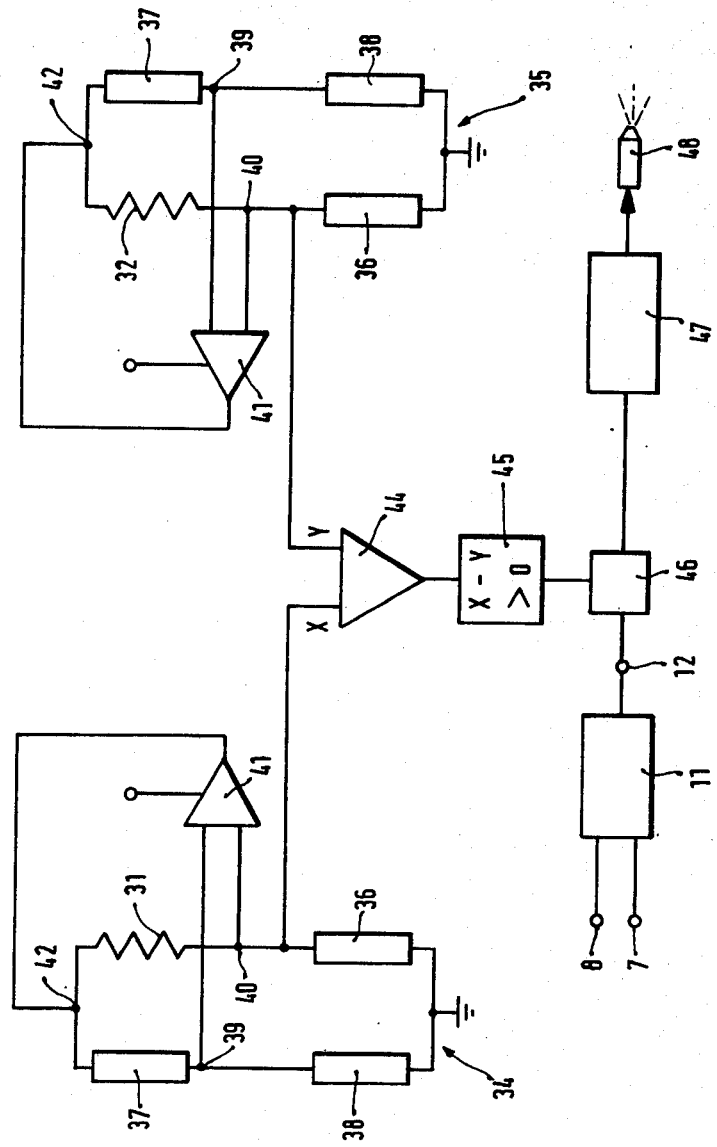
FIG. 3 is a circuit diagram for correcting the measurement signal when there is a pulsating flow.

Like the temperature-dependent measuring resistor 3, the temperature-dependent indication resistors 31, 32 are also regulated to a fixed temperature value. To this end, there is a resistance measuring and regulating circuit for each resistor, as shown in FIG. 3. The first indication resistor 31 is part of a resistance measuring circuit 34, and the second indication resistor 32 is part of a resistance measuring circuit 35. The resistance measuring circuits 34, 35 are designed by way of example as bridge circuits and function identically to what has already been described with respect to the measuring resistor 3 of FIG. 1. Not only the indication resistors 31, 32 but the resistance measuring circuits 34, 35 as well are all dimensioned identically. Thus in each resistance measuring circuit 34, 35, a resistor 36 is provided in the same bridge branch as the indication resistor 31, 32, while a resistor 37 and a resistor 38 are provided in the other bridge branch. The diagonal voltage of each bridge 34, 35 appearing between the points 39, 40 is carried to the respective inputs of two amplifiers 41, whose output variable supplies each bridge 34, 35 at point 42 with operational voltage or operational current, in such a manner that the indication resistors 32, 32 are heated by the current flowing through them up to a value at which the input voltage at the amplifiers 41, that is, the bridge diagonal voltage, becomes zero or assumes a predetermined value. If the mass of flowing medium changes, then the temperature of the temperature-dependent indication resistors 31, 32 changes as well, as a result of which the voltage at the bridge diagonal varies and the amplifier 41 varies the bridge supply voltage or current to a value at which the bridge 34, 35 is again balanced or is imbalanced in a predetermined manner.

In accordance with the principle of physics that where a body experiences a transverse flow against it, and there is a laminar boundry layer at the end of the body experiencing the flow which is facing into the flow, a greater heat transfer into the flowing medium takes place than at the end of the body remote from the flow, the indication resistors 31, 32, which are disposed in accordance with the invention such that they are spaced apart from one another in the flow direction, have different resistance values x, y. These resistance values are ascertained and fed in accordance with the invention to a comparison circuit 44, at the output of which there is an interrogation circuit 45 which interrogates the difference x-y between the resistance values of the indication resistors 31, 32. The interrogation circuit 45 is followed by a correction circuit 46, having, by way of example, a switching function. The correction circuit 46 is also connected to the output of the amplifier 11, which provides the measurement signal $U_S$ in accordance with the mass of the flowing medium, and on the other side the correction circuit is connected to the input of an electronic control unit 47, which may by way of example be part of an electronic fuel injection system and triggers electromagnetic fuel injection valves 48. Now if the apparatus according to the invention for measuring the mass of a flowing medium is disposed in a pulsating flow, for instance, in the air intake tube of an internal combustion engine, then where there is a flow reversal the difference x-y of the resistance values of the indication resistors 31, 32 changes as well, because a greater heat transfer now occurs at the second indication resistor as at the first indication resistor 31. This change in the difference of the resistance values x-y of the indication resistors 31, 32 is used in accordance with the method of the invention to influence the measurement signal located at the output of the amplifier 11, for instance in such a way that if there is a flow in a direction counter to the desired flow direction 2 of the medium, the measurement signal is suppressed. Given an undesired, opposite flow direction, the correction circuit would then not permit any measurement signal to reach the electronic control unit 47, while if there is a flow of the medium in the desired flow direction 2, it would permit the measurement signal to pass unchanged to the electronic control unit 47.

The invention is not restricted exclusively to the method described and shown or to the illustrated embodiment of an apparatus for measuring the mass of a flowing medium. It is also possible for the difference of the resistance values of the measuring resistor 3 and the first indication resistor 31 or second indication resistor 32 to be used in a corresponding manner to recognize the flow direction of the medium in a pulsating flow and to influence the measurement signal in a corresponding manner. In such an embodiment, the measuring resistor 3 also serves as an indication resistor, and only one of the indicator resistors 31, 32 and an associated regulating circuit is required. The method and apparatus according to the invention permit the ascertainment of a correct measurement signal corresponding to the flowing mass of medium even when there is a pulsating flow, without there being any error component in the measurement signal caused by the pulsation.

Figure 4:
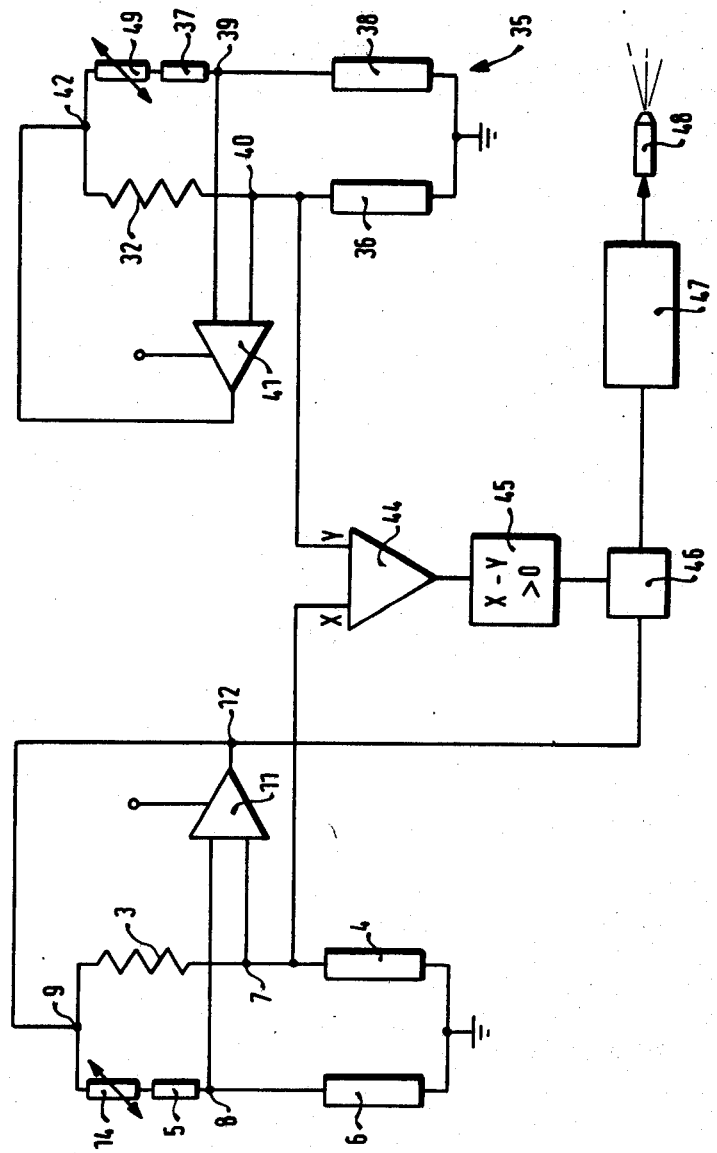
FIG. 4 is a circuit diagram for correcting the measurement signal when there is a pulsating flow.

As shown in FIG. 4, the temperature-dependent first indication resistor 31 and the resistance measuring and regulating circuit 34 as shown in FIG. 3 can be replaced by the measuring resistor 3 and the resistance measuring and regulating circuit as shown in FIG. 1. In such an embodiment the measuring resistor 3 serves as an first indication resistor 31 as shown in FIG. 3. Not only the measuring resistor 3 and the indication resistor 32 but the resistance measuring circuit of the measuring resistor 3 and the resistance measuring circuit 35 as well are all dimensioned identically. So the resistors 37 and 49 in the bridge 35 are of the same dimension as the resistors 5 and 14 in the bridge of the measuring resistor 3. The function of the embodiment as shown in FIG. 4 is like as described to the embodiment as shown in FIG. 3.

The foregoing relates to a preferred exemplary embodiment of the invention, it being understood that other embodiments and variants thereof are possible within the spirit and scope of the invention, the latter being defined by the appended claims. What is claimed and desired to be secured by Letters Patent of the United States is:

1. In a method for measuring the mass of a pulsating medium flowing in a flow cross section, which includes the steps of regulating a current flowing through a temperature-dependent measuring resistor disposed in the flow cross section so as to maintain the measuring resistor at a predetermined temperature above the temperature of the medium, and providing a measurement signal corresponding to the measuring resistor current and representing the flowing mass of medium, the improvement which comprises the steps of:
    determining the direction of flow of the medium by regulating a current flowing through a first temperature-dependent indication resistor so as to maintain the first indication resistor at a predetermined temperature above the medium temperature, the first indication resistor being disposed within the flow cross section so that, for a given flowing mass of medium, greater heat transfer from the first indication resistor into the medium occurs when the medium is flowing in a first direction than when the medium is flowing in an opposite second direction;
    measuring a resistance value of the first indication resistor; and
    influencing the measurement signal in accordance with medium flow direction.

2. A method, as described in claim 1, wherein the step of determining the medium flow direction further comprises the steps of:
    regulating a current flowing through a second temperature-dependent indication resistor so as to maintain the second indication resistor at a predetermined temperature above the medium temperature, the second indication resistor being disposed within the flow cross section such that, for a given mass of flowing medium, the heat transfer from the second indication resistor into the medium which occurs when the medium is flowing in the second direction is at least as great as the heat transfer from the second indication resistor into the medium which occurs when the medium is flowing in the first direction;
    measuring a resistance value of the second indication resistor; and
    comparing the resistance values of the first and second indication resistors, the result of said comparison being an indication of the medium flow direction.

3. A method as described in claim 2, wherein:
    the first and second indication resistors have identical temperature-dependent resistance values, and the currents flowing through the first and second indication resistors are regulated to maintain the first and second indication resistors at the same predetermined temperature;
    the second indication resistor is disposed within the flow cross section such that, for a given flowing mass of medium, greater heat transfer from the second indication resistor into the medium occurs when the medium is flowing in the second direction than when the medium is flowing in the first direction;
    the step of comparing the resistance values of the first and second indication resistors comprises determining the difference between the resistance value of the first indication resistor and the resistance value of the second indication resistor; and
    the step of influencing the measurement signal is effected in accordance with said resistance value difference.

4. A method, as described in claim 2, wherein the measuring resistor, the first indication resistor, and the second indication resistor are embodied as layer resistors.

5. A method, as described in claim 1 wherein:
    the measuring resistor is disposed in the flow cross section such that, for a given mass of flowing medium, the heat transfer from the measuring resistor which occurs when the medium is flowing in the second direction is at least as great as the heat transfer from the measuring resistor into the medium which occurs when the medium is flowing in the first direction;
    the step of regulating the measuring resistor current includes the step of measuring a resistance value of the measuring resistor; and
    the step of determining the medium flow direction includes the step of comparing the resistance values of the first indication resistor and the measuring resistor, the result of said comparison being an indication of the medium flow direction.

6. A method, as described in claim 2, 5, or 3, wherein the step of influencing the measurement signal is effected by suppressing the measurement signal whenever the determined medium flow direction is counter to the desired medium flow direction.

7. In an apparatus for measuring the mass of a pulsating medium flowing in a flow cross section, which includes a temperature-dependent measuring resistor disposed in the flow cross section and measuring resistor regulating means for regulating a current flowing through measuring resistor to maintain the measuring resistor at a predetermined temperature above the temperature of the flowing medium, the measuring resistor regulating means including signal generating means for providing a measurement signal corresponding to the measuring resistor current and representing the flowing mass of medium, the improvement which comprises:
    flow direction determining means for determining the direction of flow of the medium comprising a first temperature-dependent indication resistor which is disposed within the flow cross section so that, for any given flowing mass of medium, greater heat transfer from the first indication resistor into the flowing medium occurs when the medium is flowing in a first direction than when the medium is flowing in an opposite second direction;
    first indication resistor regulating means for regulating a current flowing through the first indication resistor to maintain the first indication resistor at a predetermined temperature above the medium temperature, including resistance measuring means for measuring a resistance value of the first indication resistor; and
    signal influencing means for influencing the measurement signal in accordance with the medium flow direction.

8. An apparatus, as described in claim 7, wherein the flow direction determining means further comprises:
- a second temperature-dependent indication resistor which is disposed within the flow cross section so that, for a given flowing mass of medium, the heat transfer from the second indication resistor into the medium which occurs when the medium is flowing in the second direction is at least as great as the heat transfer from the second indication resistor into the medium which occurs when the medium is flowing in the first direction;
- second indication resistor regulating means for regulating a current flowing through the second indication resistor to maintain the second indication resistor at a predetermined temperature above the medium temperature, including resistance measuring means for measuring a resistance value of the second indication resistor; and
- comparing means for comparing the resistance values of the first and second indication resistors, the result of said comparison being an indication of the medium flow direction.

9. An apparatus, as described in claim 8, wherein the second temperature-dependent indication resistor is disposed within the flow cross section so that, for a given flowing mass of medium, greater heat transfer from the second indication resistor into the medium occurs when the medium is flowing in the second direction than when the medium is flowing in the opposite first direction.

10. An apparatus, as described in claim 8 or 9, which further comprises a carrier disposed within the flow cross section, wherein the first and second indication resistors are disposed on the carrier, electrically insulated from one another, and spaced apart in the flow direction.

11. An apparatus, as described in claim 8, which further comprises a carrier disposed within the flow cross section, wherein the measuring resistor, the first indication resistor, and the second indication resistor are disposed on the carrier electrically insulated from one another and spaced apart from one another in the flow direction.

12. An apparatus, as described in claim 11, wherein for one of the first and second medium flow directions, the first indication resistor is disposed upstream of the measuring resistor on an end of the carrier facing into the flow, and the second indication resistor is disposed downstream of the measuring resistor on the opposite end of the carrier remote from the flow.

13. An apparatus, as described in claim 12, wherein the first and second indication resistors are dimensioned identically and the first and second indication resistor regulating means are identical, wherein the comparing means determines the difference between the resistance value of the first indication resistor and the resistance value of the second indication resistor and the signal influencing means influences the measurement signal in accordance with said resistance value difference.

14. An apparatus, as described in claim 8, 11, 12 or 13 wherein the measuring resistor, the first indication resistor and the second indication resistor are embodied as layer resistors.

15. An apparatus, as described in claim 7 wherein:
- the measuring resistor is disposed in the flow cross section so that, for a given flowing mass of medium, the heat transfer from the measuring resistor into the medium which occurs when the medium is flowing in the second direction is at least as great as the heat transfer from the measuring resistor into the medium which occurs when the medium is flowing in the first direction;
- the measuring resistor regulating means further comprises resistance measuring means for measuring a resistance value of the measuring resistor; and
- the flow direction determining means further comprises comparing means for comparing the resistance values of the first indication resistor and the measuring resistor, the result of said comparison being an indication of the medium flow direction.

16. An apparatus, as described in claim 7, 8, 15, or 13, wherein the measurement signal influencing means suppresses the measurement signal whenever the medium flow direction determined by the comparing means is counter to a desired medium flow direction.

17. An apparatus, as described in claim 15, wherein the measuring resistor and the first indication resistor are embodied as layer resistors.

* * * * *